United States Patent
Zhou et al.

(10) Patent No.: US 9,244,326 B2
(45) Date of Patent: Jan. 26, 2016

(54) INKS INCLUDING GRAFT COPOLYMER SURFACE-MODIFIED PIGMENTS VIA AZIDE CHEMISTRY

(75) Inventors: Zhang-Lin Zhou, Palo Alto, CA (US); Qin Liu, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 14/369,301

(22) PCT Filed: Jan. 17, 2012

(86) PCT No.: PCT/US2012/021569
§ 371 (c)(1),
(2), (4) Date: Jun. 27, 2014

(87) PCT Pub. No.: WO2013/109250
PCT Pub. Date: Jul. 25, 2013

(65) Prior Publication Data
US 2015/0036207 A1  Feb. 5, 2015

(51) Int. Cl.
*G02B 26/00* (2006.01)
*G09G 3/34* (2006.01)
(Continued)

(52) U.S. Cl.
CPC .............. *G02F 1/167* (2013.01); *C09D 11/033* (2013.01); *C09D 11/037* (2013.01); *C09D 11/10* (2013.01);
(Continued)

(58) Field of Classification Search
CPC ...... G02B 26/00; G02B 26/004; G02B 26/02; G02B 26/026; G02F 1/167; G02F 2001/1678; C09D 11/00; C09D 11/033; C09D 11/037; C09D 11/10; C09D 11/322; C09D 11/326; C09D 11/36; C08L 51/00; C08L 51/04; C08L 51/06; C08F 16/28; C08F 290/04

USPC .......... 359/296, 228; 345/107; 524/261, 269, 524/359.4, 504, 544, 547, 548, 607; 525/299, 420
See application file for complete search history.

(56) References Cited

U.S. PATENT DOCUMENTS 6,495,618 B1   12/2002   Ma
6,905,807 B2    6/2005   Morrison et al.
(Continued)

FOREIGN PATENT DOCUMENTS

CN   102203192   9/2011
CN   102203665   9/2011
(Continued)

OTHER PUBLICATIONS

Gao, H. et al., Synthesis of Molecular Brushes by "Grafting onto" Method: Combination of ATRP and Click Reactions, (Research Paper), Journal American Chemical Society, Apr. 28, 2007, pp. 6633-6639, vol. 129, No. 20.

(Continued)

*Primary Examiner* — Loha Ben
(74) *Attorney, Agent, or Firm* — Hewlett-Packard Patent Department

(57) ABSTRACT

Pigment based inks are provided. The inks include a non-polar carrier fluid and a surface-functionalized pigment particle including a nitrogen-linked moiety to the surface of the pigment particle through a nitrogen link at one end of the nitrogen-linked moiety and a graft copolymer having two or three blocks attached at another end, the pigment particle suspended in the non-polar carrier fluid, the nitrogen-linked moiety further including an alkyl chain interposed between the nitrogen-linked moiety and the graft copolymer having the structure (I), where X is the nitrogen-linked moiety and Y is a copolymer, and the letter a is an integer between 0 and about 5,000, while the letter b is an integer of 2 or more.

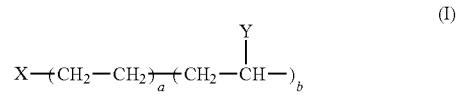

(I)

15 Claims, 4 Drawing Sheets

(51) Int. Cl.
*G02F 1/167* (2006.01)
*G02B 26/02* (2006.01)
*C09D 11/10* (2014.01)
*C09D 11/033* (2014.01)
*C09D 11/037* (2014.01)
*C09D 11/107* (2014.01)
*G02F 1/1333* (2006.01)
*C08L 51/06* (2006.01)

(52) U.S. Cl.
CPC ............. *C09D 11/107* (2013.01); *G02B 26/02* (2013.01); *G02B 26/026* (2013.01); *G02F 1/133348* (2013.01); *C08L 51/06* (2013.01); *G02B 26/004* (2013.01); *G02F 2001/1678* (2013.01)

(56) References Cited

U.S. PATENT DOCUMENTS

| | | | |
|---|---|---|---|
| 6,911,073 | B2 | 6/2005 | Adams et al. |
| 7,952,791 | B2* | 5/2011 | Yanagisawa ........ C08F 290/068 345/107 |
| 8,896,906 | B2* | 11/2014 | Zhou ................... C09D 11/033 359/296 |
| 2002/0183473 | A1 | 12/2002 | Matyjaszewski et al. |
| 2004/0242023 | A1 | 12/2004 | Yan et al. |
| 2005/0018273 | A1 | 1/2005 | Honeyman et al. |
| 2005/0267252 | A1 | 12/2005 | Minami et al. |
| 2006/0079603 | A1 | 4/2006 | Sato et al. |
| 2011/0242641 | A1 | 10/2011 | Du et al. |
| 2011/0261435 | A1 | 10/2011 | Grinwald et al. |
| 2012/0300284 | A1 | 11/2012 | Zhou et al. |
| 2015/0210873 | A1* | 7/2015 | Zhou ...................... C09D 11/10 359/296 |

FOREIGN PATENT DOCUMENTS

| | | |
|---|---|---|
| CN | 102300890 | 12/2011 |
| JP | 2002331740 | 11/2002 |
| JP | 2006113390 | 4/2006 |
| JP | 2008145713 | 6/2006 |
| JP | 2009529443 | 8/2009 |
| WO | WO 2008/146950 | 12/2008 |
| WO | WO 2010/087841 | 8/2010 |
| WO | WO 2012/148408 | 11/2012 |

OTHER PUBLICATIONS

Cai, T. et al., Surface-functionalized and Surface-functionalizable Poly(vinylidene Fluoride) Graft Copolymer Membranes via Click Chemistry and Atom Transfer Radical Polymerization, (Research Paper), Langmuir The ACS Journal of Surfaces and Colloids, Feb. 22, 2011, pp. 2936-2945, vol. 27, No. 6.

Bulychev, N. et al., Surface Modification in Aqeous Dispersions with Thermo-responsive Poly (methylvinylether) Copolymers in Combination with Ultrasonic Treatment, (Research Paper), Journal Chemistry and Chemical Technology, 2011, pp. 59-65, vol. 5, No. 1.

The Extended European Search Report for Application No. 12866092.5 dated Jun. 8, 2015, 8 pages.

* cited by examiner

INKS INCLUDING GRAFT COPOLYMER SURFACE-MODIFIED PIGMENTS VIA AZIDE CHEMISTRY

BACKGROUND

Ultrathin, flexible electronic displays that look like print on paper have many potential applications including wearable computer screens, electronic paper, smart identity cards, store shelf labels, and signage applications. Electrophoretic or electrokinetic displays are an important approach to this type of medium. Electrophoretic actuation relies on particles moving under the influence of an electric field. Accordingly, the desired particles must exhibit good dispersibility and charge properties in non-polar dispersing media. Non-polar dispersing media are desirable because they help minimize the leakage currents in electrophoretic or kinetic devices.

Current commercial products based on electrophoretic display technology are only able to provide color and white states or black and white states. They cannot provide a clear or transparent state, which prevents use of a stacked architecture design. A stacked architecture of layered colorants would allow the use of transparent to colored state transitions in each layer of primary subtractive color resulting in print-like color in one display.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
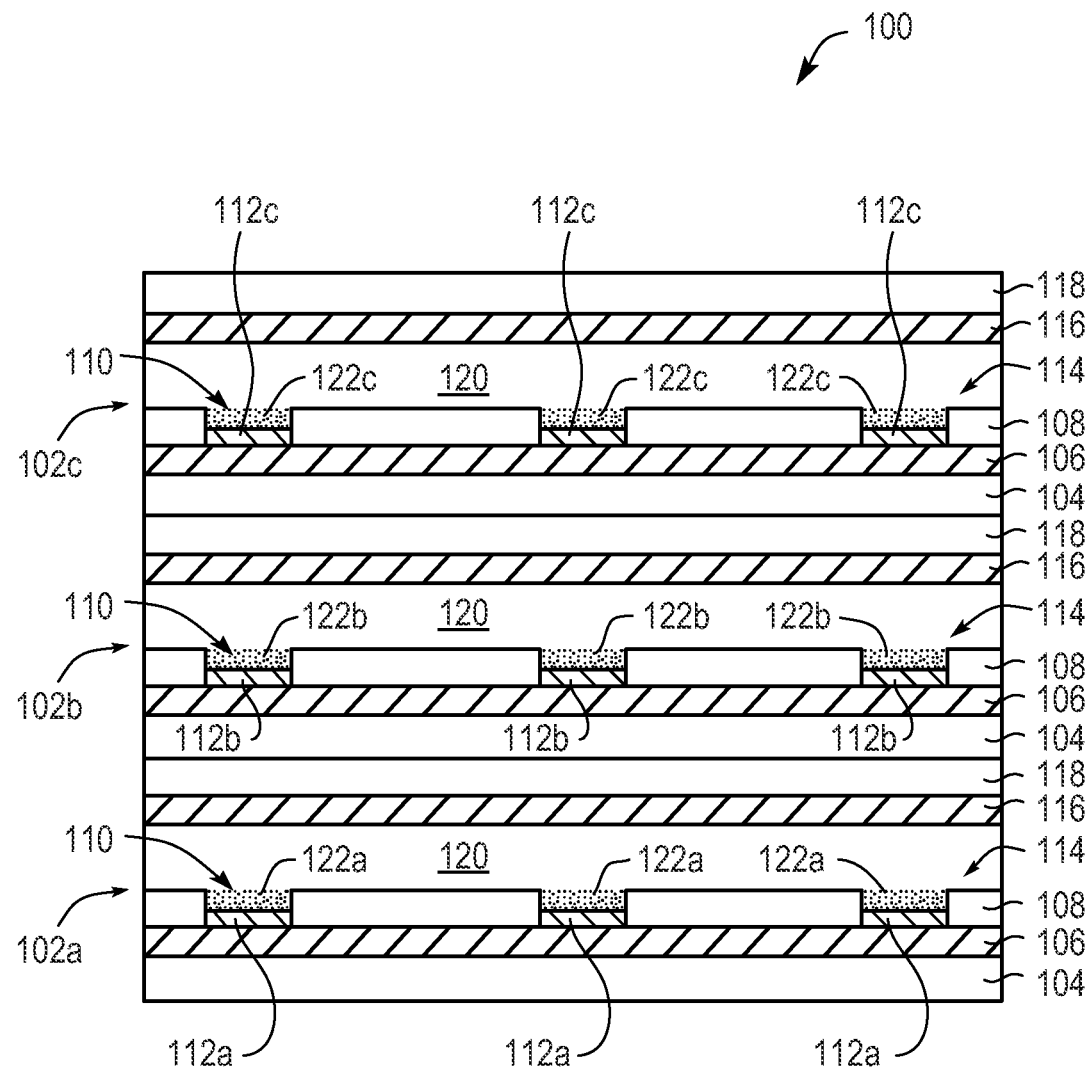
FIG. 1 depicts a cross-sectional view of one example of a stacked electro-optical display.

Reference is made now in detail to specific examples, which illustrates the best mode presently contemplated by the inventors for practicing the invention. Alternative examples are also briefly described as applicable.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electronic ink display" is a display that forms visible images using one or more of electrophoresis, electro-convection, electroosmosis, electrochemical interactions, and/or other electrokinetic phenomena.

As used herein, "about" means a ±10% variance caused by, for example, variations in manufacturing processes.

The article 'a' and 'an' as used in the claims herein means one or more.

Significant progress has been made towards developing working electronic inks based on the electrokinetic mechanism using conventional stabilization techniques and materials. However, improvements in reliability are still needed for commercially successful applications. These previous electronic inks are based on pigments with additional surfactants and charge directors, in which both charging and stabilization related functionality are not covalently bonded to the pigment surface. In this case, the pigment can lose charge with time under electric field or repeated switching cycles. The adsorbed stabilizing polymer material on the pigment surface is capable of desorbing and the free polymeric species in the solvent are capable of degradation as a result of cell operation. Additional surfactants in the solvent also result in higher background charges which can lead to field screening effects.

Surface modification of $TiO_2$ pigment has been demonstrated, using a "random graft polymerization" method to introduce a polymer onto the $TiO_2$ pigment surface through polymerizable or polymerization-initiating groups attached to the surface of the particles. The major drawback of this approach is that polymers are formed in the presence of the particles. It is more difficult to obtain well controlled systems where the unintended products can be cleaned up more easily.

Bi-state and/or tri-state electrophoretic display cells (or elements) having a three-dimensional architecture for compacting charged colorant particles within the display cells are described in US Patent Publication 2010/0245981, published Sep. 30, 2010. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid. The ink fluid is colored by a dye, nanoparticle colorants, pigments, or other suitable colorants. A white state is achieved when the white particles are spread and held in proximity to the surfaces closest to the viewer, and a colored state is achieved when the white particles are compacted to allow absorption by the colorant fluid and subsequent reflection by a diffuse reflector in the back of the cell, or when the white particles are distributed throughout the colorant fluid to backscatter the light that has not been absorbed by the colorant fluid. By combining the white particles in the colored fluid with a different colored resin on the back of the display cell, a tri-state display cell is provided.

An electrophoretic display cell may include a three-dimensional architecture to provide a clear optical state. In this architecture, the geometrical shape of the display cell has narrowing portions in which electrophoretically/electrokinetically translated colorant particles collect and compact in response to appropriate bias conditions applied to driving electrodes on opposite sides of the display cell. The three-dimensional structure of the display cell introduces additional control of electrophoretically/electrokinetically moving colorant particles. As a result, desired functionalities can be achieved with a more stable electrophoretic/kinetic ink that resists irreversible agglomeration of the particles, but maintains its ability to both disperse and collect and compact the particles. The driving electrodes are passivated with a dielectric layer, thus eliminating the possibility of electrochemical interactions through the driving electrodes from direct contact with the electrophoretic ink. In other examples, the driving electrodes are not passivated, thus allowing electrochemical interactions with the electrophoretic/kinetic ink.

An example of a stacked device architecture is shown in FIG. 1. This configuration allows stacking of colored layers for electrophoretic/kinetic displays.

FIG. 1 illustrates a cross-sectional view of one example of stacked electro-optical display 100. Electro-optical display 100 includes a first display element 102a, a second display element 102b, and a third display element 102c. Third display element 102c is stacked on second display element 102b, and second display element 102b is stacked on first display element 102a.

Each display unit includes a first substrate 104, a first electrode 106, a dielectric layer 108 including reservoir or recess regions 110, thin layers 112, a display cell 114, a second electrode 116, and a second substrate 118. Display cell 114 is filled with a carrier fluid 120 with colorant particles 122. In some examples, thin layers 112 may be opaque. In other examples, thin layers 112 may be transparent.

First display element 102a includes thin layers 112a self-aligned within recess regions 110. First display element 102a also includes colorant particles 122a having a first color (e.g., cyan) for a full color electro-optical display.

Second display element 102b includes thin layers 112b self-aligned within recess regions 110. Second display element 102b also includes colorant particles 122b having a second color (e.g., magenta) for a full color electro-optical display.

Third display element 102c includes thin layers 112c self-aligned within recess regions 110. Third display element 102c also includes colorant particles 122c having a third color (e.g., yellow) for a full color electro-optical display. In other examples, colorant particles 122a, 122b, and 122c may include other suitable colors for providing an additive or subtractive full color electro-optical display.

In the example illustrated in FIG. 1, in the electro-optical display 100, first display element 102a, second display element 102b, and third display element 102c are aligned with each other. As such, thin layers 112a, 112b, and 112c are also aligned with each other. In this example, since recess regions 110 and self-aligned thin layers 112a, 112b, and 112c of each display element 102a, 102b, and 102c, respectively, are aligned, the clear aperture for stacked electro-optical display 100 is improved compared to a stacked electro-optical display without such alignment.

In an alternate example (not shown), first display element 102a, second display element 102b, and third display element 102c may be offset from each other. As such, thin layers 112a, 112b, and 112c are also offset from each other. In this example, since recess regions 110 and self-aligned thin layers 112a, 112b, and 112c are just a fraction of the total area of each display element 102a, 102b, and 102c, respectively, the clear aperture for stacked electro-optical display 100 remains high regardless of the alignment between display elements 102a, 102b, and 102c. As such, the process for fabricating stacked electro-optical display 100 is simplified. The self-aligned thin layers 112a, 112b, and 112c prevent tinting of each display element due to colorant particles 122a, 122b, and 122c, respectively, in the clear optical state. Therefore, a stacked full color electro-optical display having a bright, neutral white state and precise color control is provided.

As indicated above, this architecture enables both clear and colored states. However, developing electronic inks that work in this architecture has been challenging. The materials used in presently-available commercial products do not work in this architecture, since they do not provide clear states. Significant progress toward developing working electronic inks for this architecture has been made; see, e.g., PCT/US2009/060971 ("Electronic Inks"); PCT/US2009/060989 ("Dual Color Electronically Addressable Ink"); and PCT/US2009/060975 ("Electronic Inks"), all filed Oct. 16, 2009.

The foregoing discussion is directed primarily to stacked cells in an electro-optical display. However, the functionalized pigments disclosed herein may also be employed in lateral cells in an electro-optical display.

Figure 2:
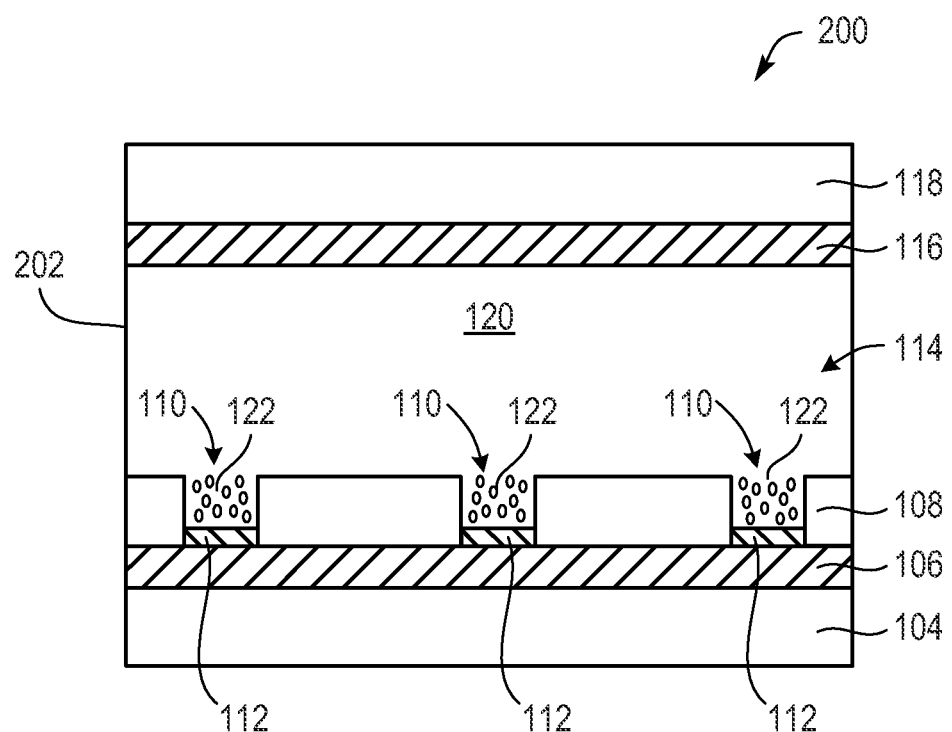
FIG. 2 illustrates a cross-sectional view of one example of a lateral electro-optical display.

FIG. 2 illustrates a cross-sectional view of one example of lateral electro-optical display 200. Electro-optical display 200 includes a display element 202. Additional display elements may be disposed laterally in the x and y directions, as side-by-side sub-pixels or segments, with each display element containing inks having colorant particles 122 of different colors, or having black colorant particles that are collected to reveal patterned color filters or wavelength-selective reflectors below.

Each display element 202 is similar to electro-optical display 100a previously described and illustrated with reference to FIG. 1. Each display element 202 may include circular shaped thin layers 110a self-aligned within recess regions 108. Each display element 202 may also include colorant particles 122 having a color (e.g., cyan, magenta, yellow, black, or white) for a full color electro-optical display. In other examples, colorant particles 122 may include other suitable colors for providing an additive or subtractive full color electro-optical display.

In accordance with the teachings herein, a new method of introducing the block copolymers (di-block or tri-block) onto tetraflurophenyl azide moiety and then grafting them onto pigment surfaces is provided. This surface modification technology can be applied to both organic and inorganic pigments.

ATRP (Atom Transfer Radical Polymerization) and RAFT (Reversible Addition-Fragmentation chain Transfer) are two surface-initiated living polymerization methods, also referred to as living polymerization methods, by which polymers can be formed. In these methods, polymerization can only occur on an initiator group, and is subsequently transferred to the end of the just added polymer chain. There are publications in the scientific literature about the application of these methods to make new polymers, but none of them deals with grafting functional block copolymers onto a pigment surface.

In polymer chemistry, living polymerization is a form of addition polymerization where the ability of a growing polymer chain to terminate has been removed. This can be accomplished in a variety of ways. Chain termination and chain transfer reactions are absent and the rate of chain initiation is also much larger than the rate of chain propagation. The result is that the polymer chains grow at a more constant rate than seen in traditional chain polymerization and their lengths remain very similar (i.e. they have a very low polydispersity index). Living polymerization is a popular method for synthesizing block copolymers since the polymer can be synthesized in stages, each stage containing a different monomer. Additional advantages are predetermined molar mass and control over end-groups.

In ATRP, the uniform polymer chain growth, which leads to low polydispersity, stems from use of a transition metal-based catalyst. This catalyst provides an equilibrium between active, and therefore propagating, polymer and an inactive form of the polymer; known as the dormant form. Since the dormant state of the polymer is vastly preferred in this equilibrium, side reactions are suppressed. This equilibrium in turn lowers the concentration of propagating radicals, therefore suppressing unintentional termination and controlling molecular weights. ATRP reactions are very robust in that they are tolerant of many functional groups such as allyl, amino, epoxy, hydroxy, and vinyl groups present in either the monomer or the initiator. ATRP methods may also be advantageous due to the ease of preparation, commercially available and inexpensive catalysts (copper complexes), pyridine based ligands and initiators (alkyl halides).

RAFT is a type of living polymerization involving a conventional radical polymerization in the presence of a reversible chain transfer reagent. Like other living polymerizations, there is no termination step in the RAFT process. It is a very versatile method to form low polydispersity polymer from monomers capable of radical polymerization. The reaction is usually done with a dithioester. The dithio compound must have a good homolytic leaving group, R, whose radical must be capable of initiating a polymerization reaction. There are four steps in RAFT polymerization: initiation, addition-fragmentation, reinitiation and equilibration.

In accordance with the teachings herein, a method of attaching novel functionalized graft copolymers onto a particle or pigment surface via azide chemistry is provided, along with the formulation of stable electronic inks based on such surface modified pigments.

Figure 3:
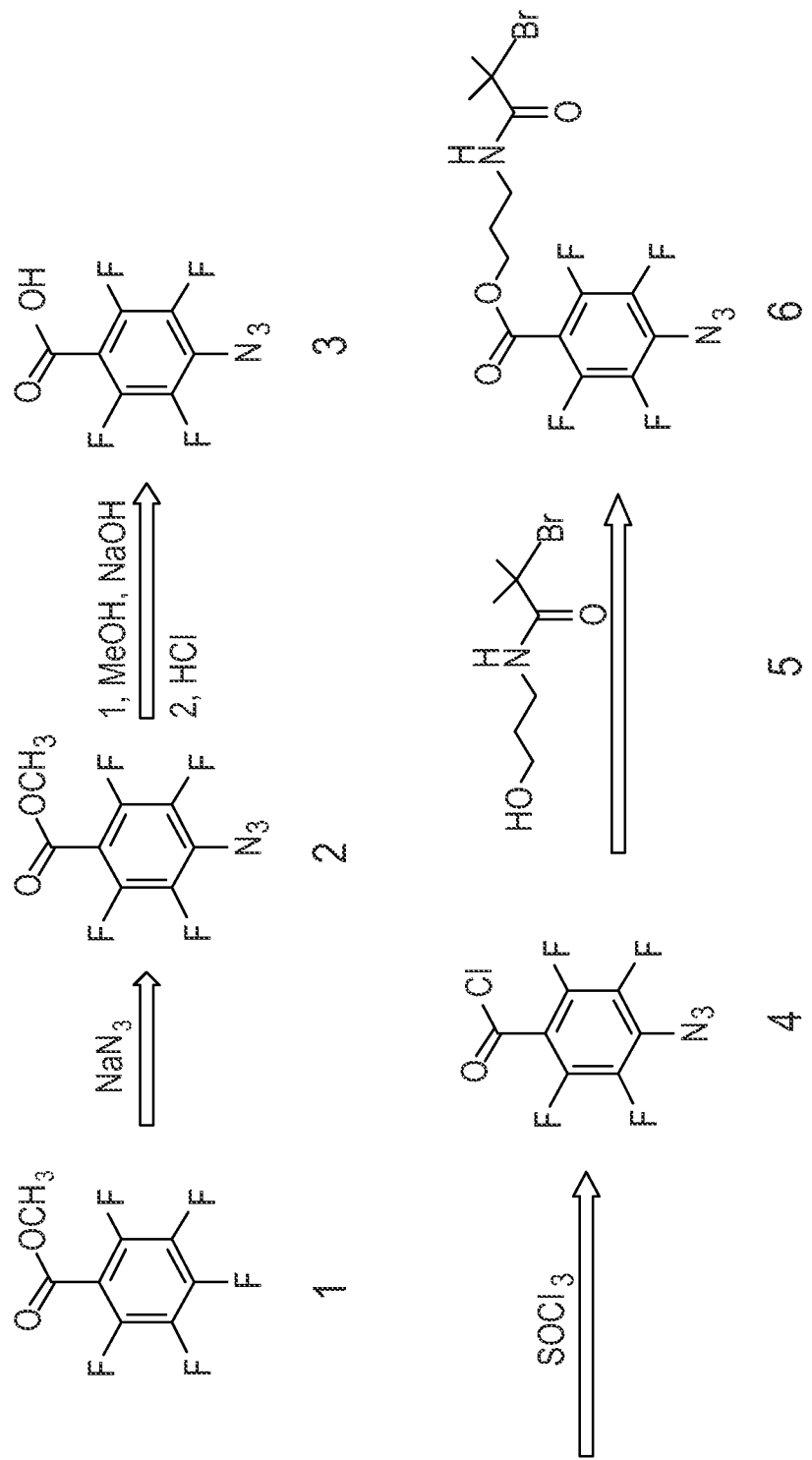
FIG. 3 is a schematic diagram of an example reaction scheme for forming a tetrafluorophenyl azide useful in the practice of the processes disclosed herein.

The process depicted herein employs a tetrafluorophenyl azide-based initiator. As shown in FIG. 3, the tetrafluorophenyl azide initiator may be prepared by reacting commercially-available methyl pentafluorobenzoate (1) with sodium azide to yield compound (2), in which the azide functionality substitutes in the para position. Hydrolysis of compound (2) with sodium hydroxide yields tetrafluorophenyl azide acid (3). Reaction of tetrafluorophenyl azide acid (3) with thionyl chloride gives tetrafluorophenyl azide acid chloride (4), which in turn reacts with 2-bromo-N-(3-hydroxypropyl)-2-methylpropanamide (5) to give tetrafluorophenyl azide-based initiator (6). The azide-based initiator may be used to form the tri-block (or di-block) copolymers, as described in greater detail below.

Examples of structures of graft copolymers employed in the teachings herein are shown below in Scheme 1 as graft copolymers 1, 2 and 3, each with slightly different graft chains.

Scheme 1

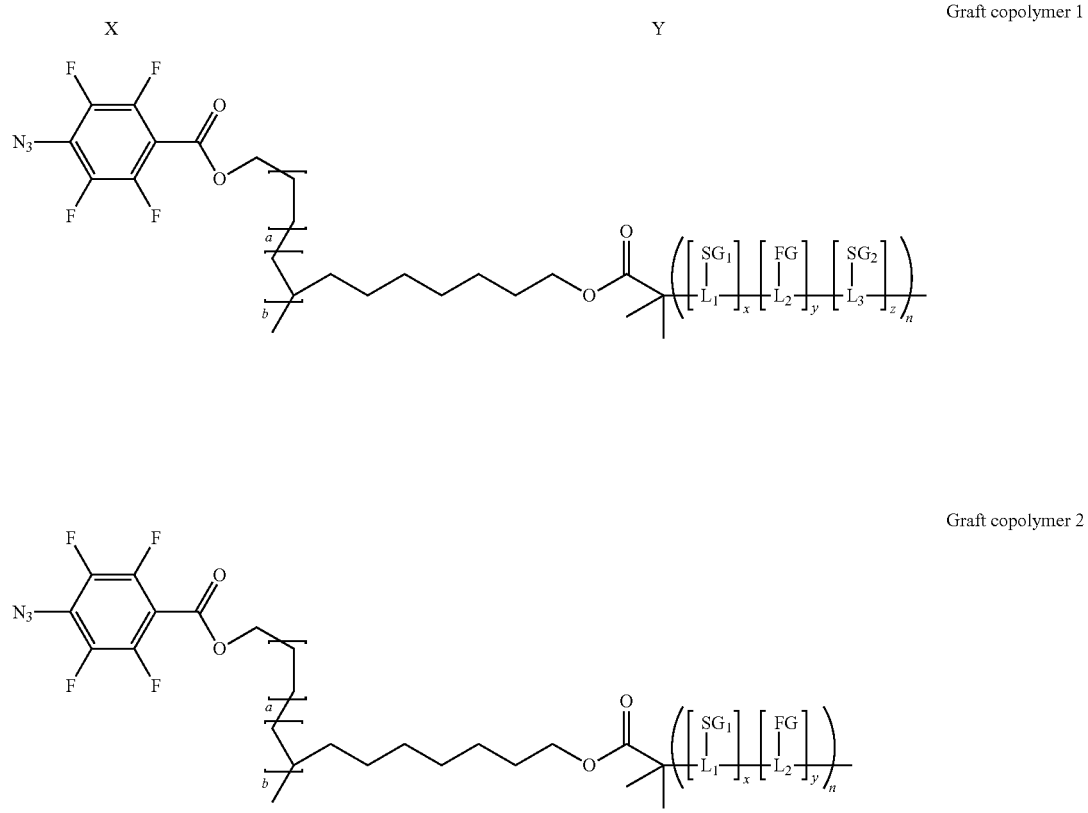

-continued

Graft copolymer 3

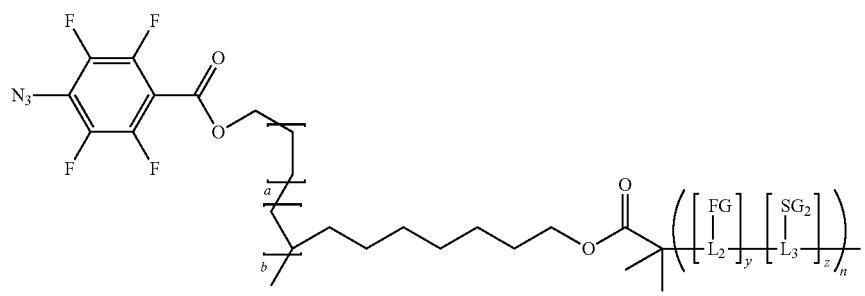

wherein, $L_1$, $L_2$, and $L_3$ are each independently a covalent bond or chemical structure providing a covalent bond between different blocks, such as C—C, C=C, C≡N, C≡O, or N≡N, for example.

$SG_1$ and $SG_2$ each independently represent a solublizing and sterically bulky group, which helps to improve the solubility of the polymer and stabilize the colorant particles; they could be any of alkyl groups, alkoxy groups, branched alkyl groups, branched alkoxy groups, aliphatic esters, branched aliphatic esters, and substituted phenyl groups.

FG represents a functional group that provides charging sites to pigment surfaces; it can be an acidic functional group such as hydroxyl, carboxylate, a sulfonic acid, a phosphonic acid or a phosphorous acid, for example, or, alternatively, it can be a basic group such as a primary amine, secondary amine, tertiary amine, pyridine, imidazoline, for example.

The letters x, y, and z are each independently an integer between 1 and about 5,000.

The letter n is an integer between 1 and about 100.

The letter a is an integer between 0 and about 5,000, while the letter b, which determines the number of grafts, is an integer of 2 or more. In some examples, a ranges from 1 to about 5,000. In some examples, b ranges from 2 to about 5,000.

Inspection of the graft copolymer formulae above reveals that if one assigns the tetrafluorophenyl azide moiety the designation X and the block copolymer the designation Y, then there is an alkyl chain interposed between X and Y as follows:

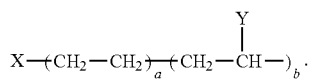

Scheme 2 shows general examples of graft copolymers 4, 5 and 6 that may be attached onto pigment surfaces, in which different portions in the graft chain are connected with carbon-carbon single bond (L=C—C).

Scheme 2

Graft copolymer 4

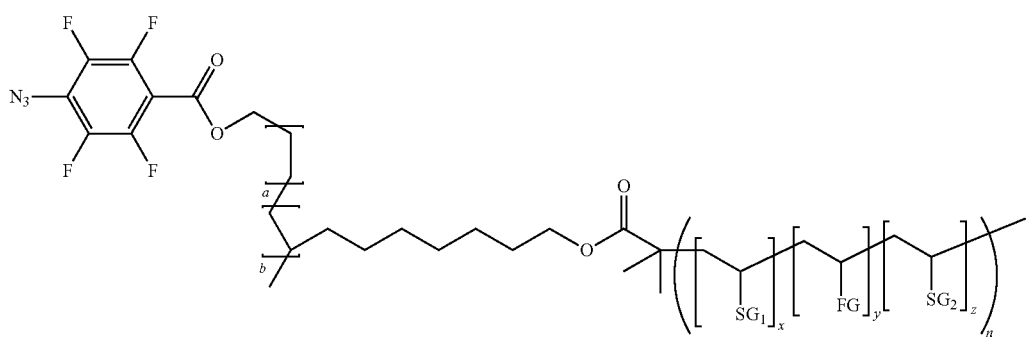

Graft copolymer 5

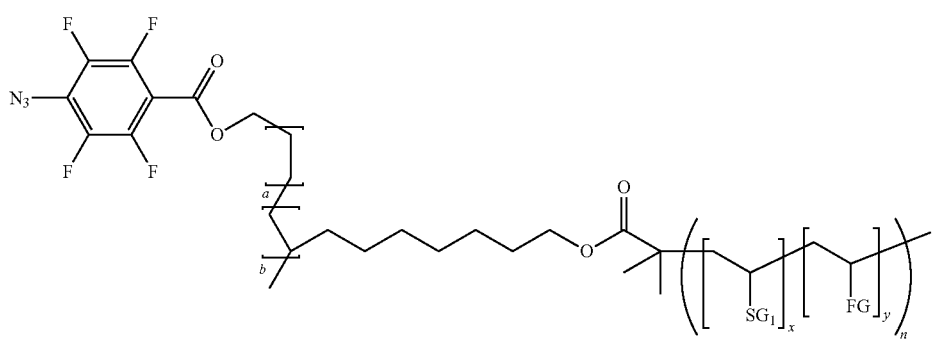

-continued

Graft copolymer 6

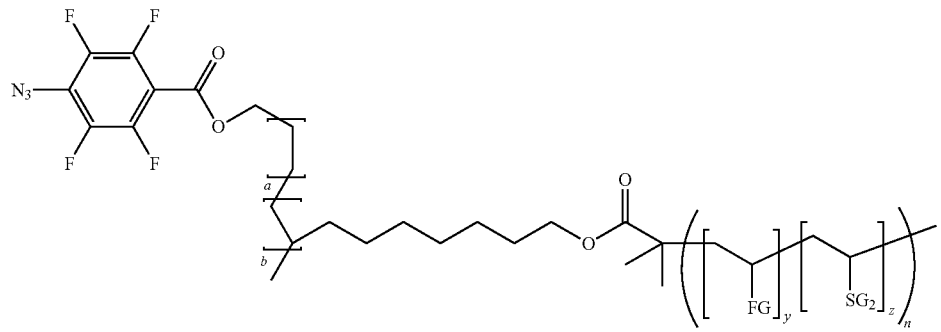

wherein,
  $SG_1$ and $SG_2$, FG, and x, y and z, and a and b are as described for Scheme 1.

Scheme 3 shows a few potential examples of vinyl-containing small molecule monomers that can be grafted onto pigment surfaces to provide stabilizing functions.

Scheme 3

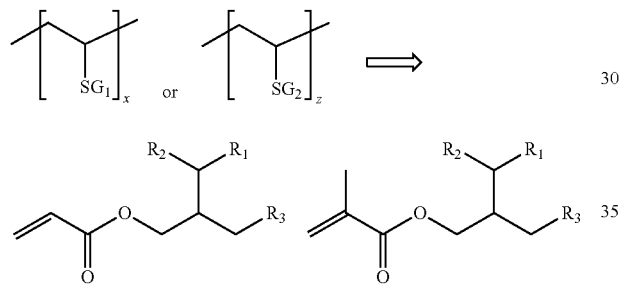

-continued

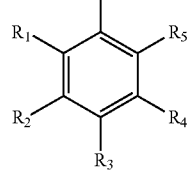

wherein,
  $R_1, R_2, R_3, R_4$ and $R_5$ are each independently selected from the group consisting of C1-C30 alkyl, C1-C30 alkenyl, C1-C30 alkynyl, C1-C30 aryl, C1-C30 alkoxy, C1-C30 phenoxy, C1-C30 thioalkyl, C1-C30 thioaryl, $C(O)OR_6$, $N(R_7)(R_8)$, $C(O)N(R_9)(R_{10})$, F, C, Br, $NO_2$, CN, acyl, carboxylate and hydroxy, wherein $R_6$, $R_7$, $R_8$, $R_9$ and $R_{10}$ are each independently selected from the group consisting of hydrogen, C1-C30 alkyl and C1-C30 aryl, and so forth. $R_1$, $R_2$, $R_3$, $R_4$, $R_5$, $R_6$, $R_7$, $R_8$ and $R_9$ may or may not be identical.

Scheme 3A shows a few more specific examples that can be used for making $SG_1$ or $SG_2$.

Scheme 3A

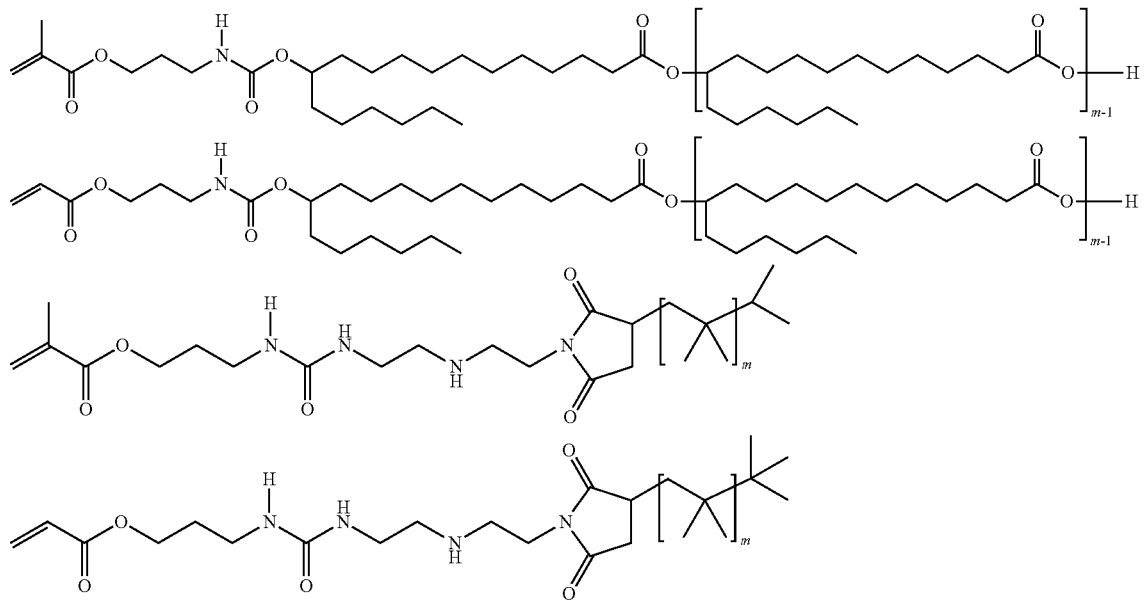

wherein, m=1 to about 5,000.

The examples shown in Scheme 3A are surfactant molecules, and may be referred to as macromolecule monomers. As used herein, macromolecule monomers refer to oligomers or polymers that have polymerizable groups, such as styrene, acrylate, or methacrylate moieties.

Scheme 4 shows some examples of monomers that can be grafted onto pigment surfaces to provide charging sites/charges to the pigment surfaces.

Scheme 5 describes a synthetic method for a macromolecular ATRP initiator containing tetrafluorophenyl azide moiety. Starting with commercially available methyl pentafluorobenzoate (1), one can react it with sodium azide to give compound 2. Hydrolysis of compound 2 with sodium hydroxide yields tetrafluorophenyl acid 3. Coupling reaction of acid 3 with NHS (N-hydroxysuccinimide) in the presence of EDC (1-ethyl-3-(3-dimethylaminopropyl)carbodiimide HCl) gives the reactive ester 4, which then reacts with macromolecular TMS (trimethylsilyl) mono-protected alcohol 5, followed by TMS cleavage to yield tetrafluorophenyl azide alcohol 6. Reaction of azide alcohol 6 with 2-bromo-2-methylpropanoyl bromide (7) gives the desired macromolecular ATRP initiator I.

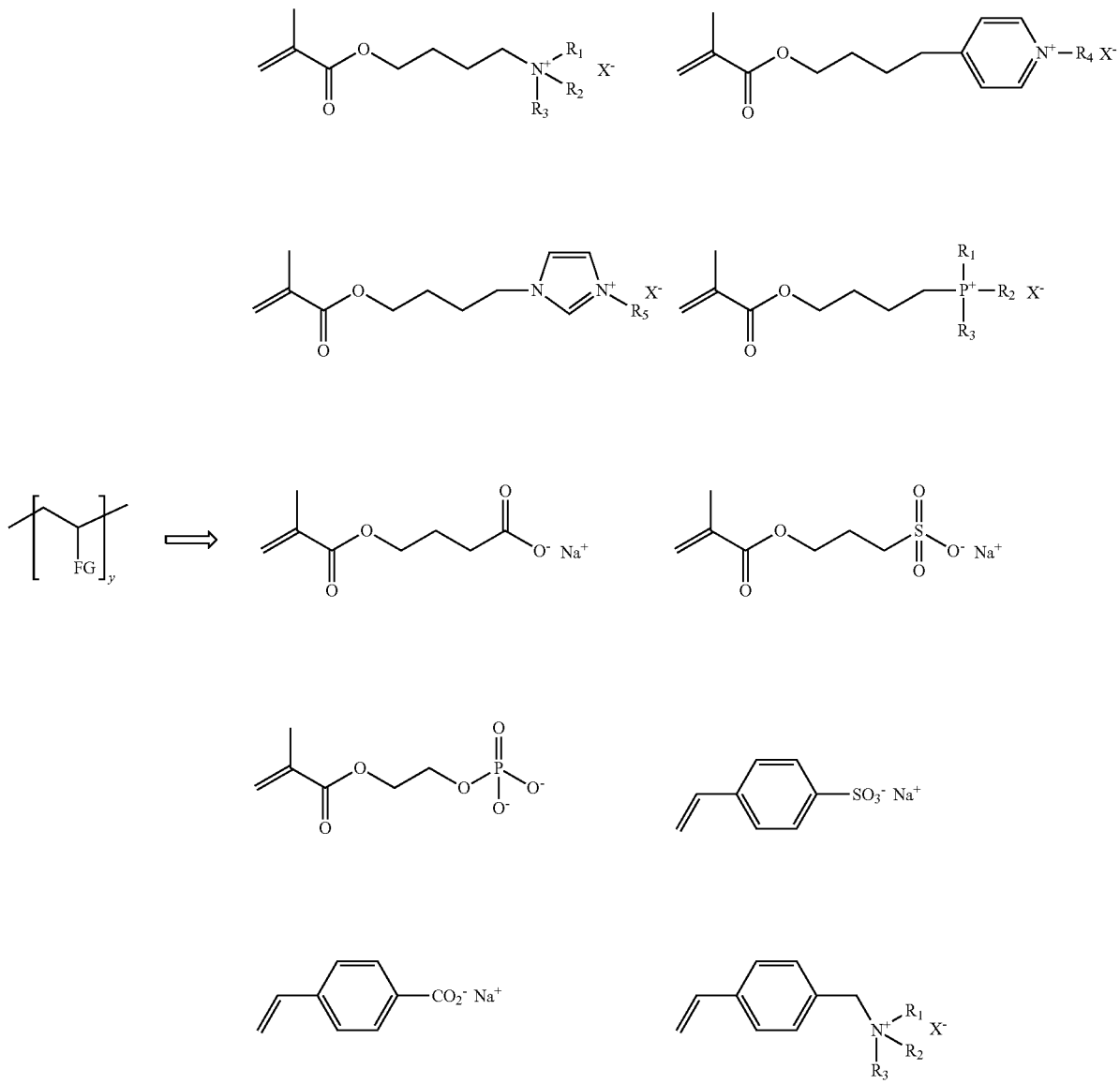

Scheme 4 wherein, $R_1$, $R_2$, $R_3$, $R_4$ and $R_5$ are each independently selected from the group consisting of C1-C30 alkyl, C1-C30 alkenyl, C1-C30 alkynyl, C1-C30 aryl, C1-C30 alkoxy, C1-C30 phenoxy, C1-C30 thioalkyl, C1-C30 thioaryl, C(O)O$R_6$, N($R_7$)($R_8$), C(O)N($R_9$)($R_{10}$), F, C, Br, NO$_2$, CN, acyl, carboxylate and hydroxy, wherein $R_6$, $R_7$, $R_8$, $R_9$ and $R_{10}$ are each independently selected from the group consisting of hydrogen, C1-C30 alkyl and C1-C30 aryl, and so forth. $R_1$, $R_2$, $R_3$, $R_4$, $R_5$, $R_6$, $R_7$, $R_8$ and $R_9$ may or may not be identical.

Scheme 5

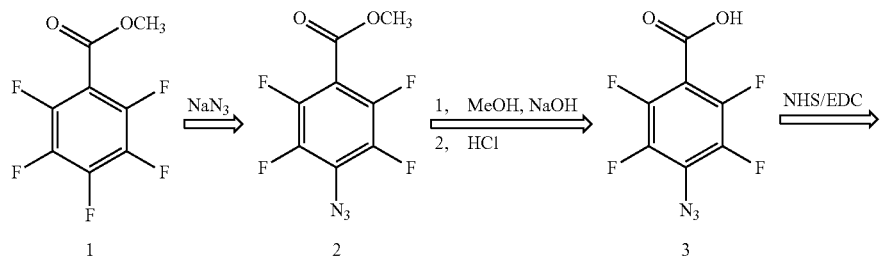

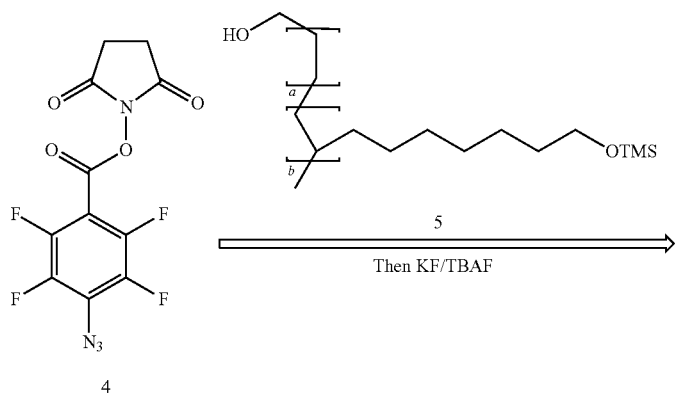

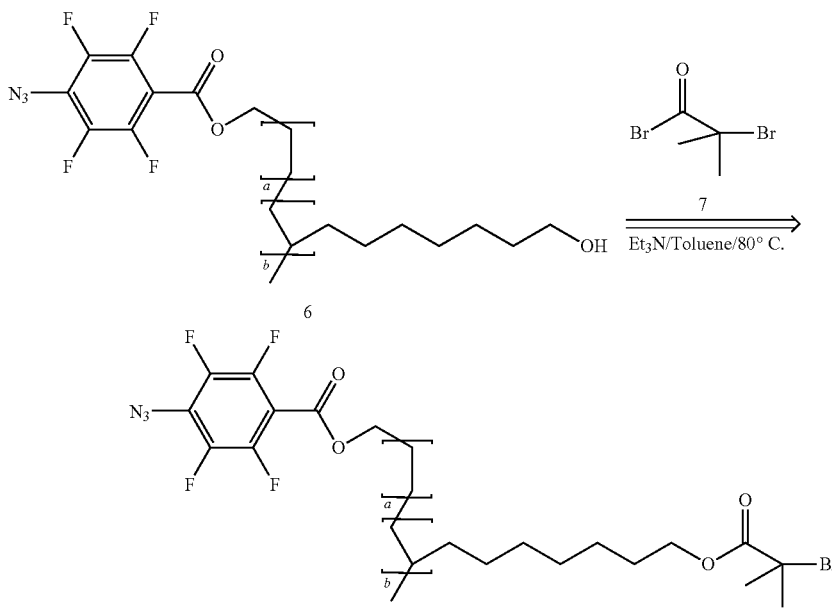

As shown in Scheme 6, a method of attaching such functionalized graft copolymer onto pigment surfaces via azide chemistry is described. Tetrafluorophenyl azide initiator I initiates the chain growth polymerization of the first monomer to give the first portion graft tetrafluorophenyl azide living polymer II. Addition of a second monomer to the living polymer II yields a two-portion graft tetrafluorophenyl living polymer III. Addition of a third monomer to the living polymer III gives a three-portion graft tetrafluorophenyl azide polymer IV. Polymer IV can be used directly for pigment surface modification. Or one can repeat steps 1, 2 and 3 n times, forming graft copolymer V. Coupling reaction of inorganic or organic pigments with three-graft—polystyrene, polyacrylic acid and polystyrene tetrafluorophenyl azide polymer IV or V upon UV irradiation gives functionalized graft copolymers modified pigment VI. Such graft copolymers modified pigments can be mixed with other surfactants or charge directors to form charged and stable pigment dispersions for electronic ink applications.

Scheme 6
Chemical process towards graft copolymers pigment surface modification via azide chemistry
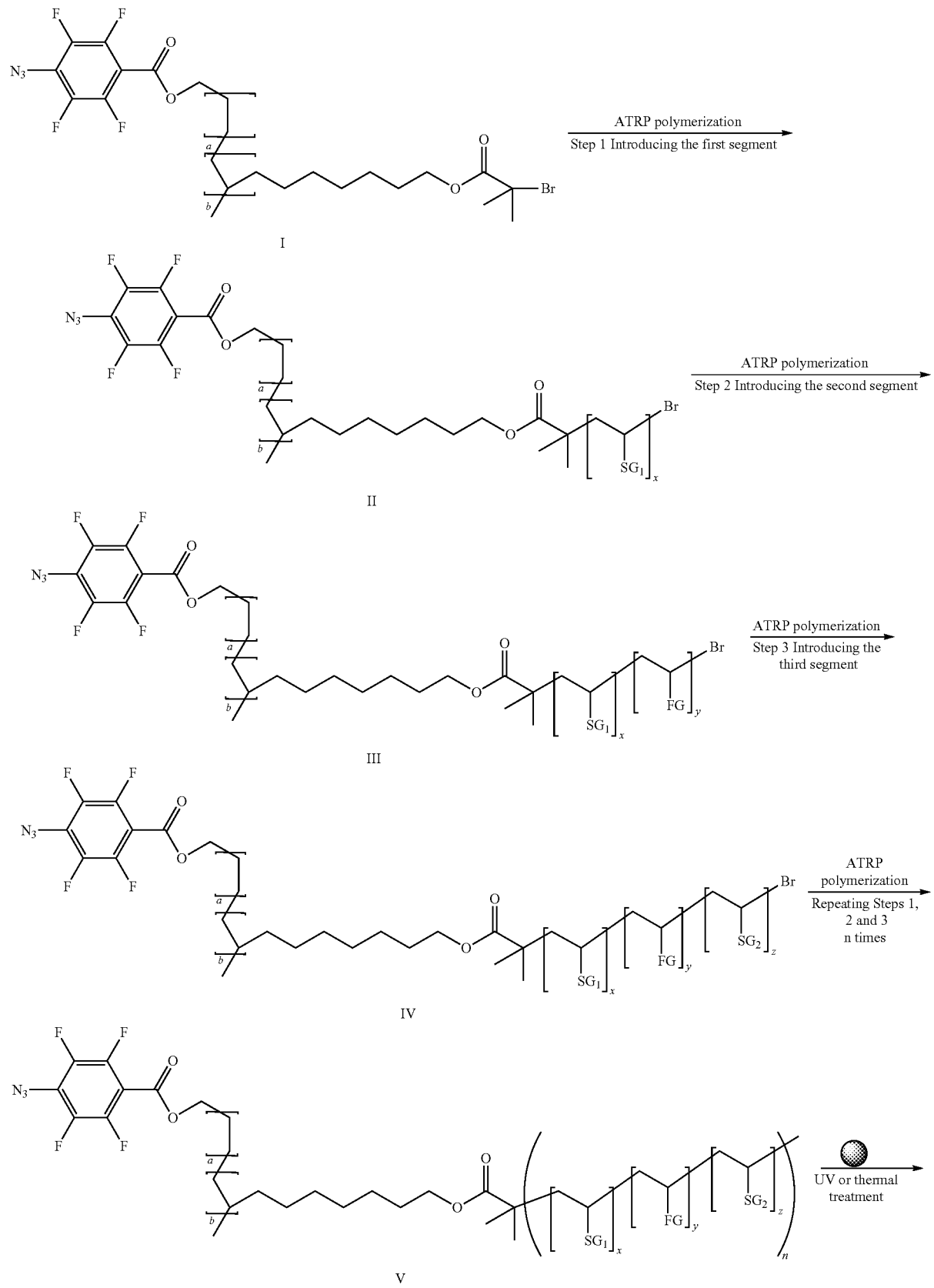

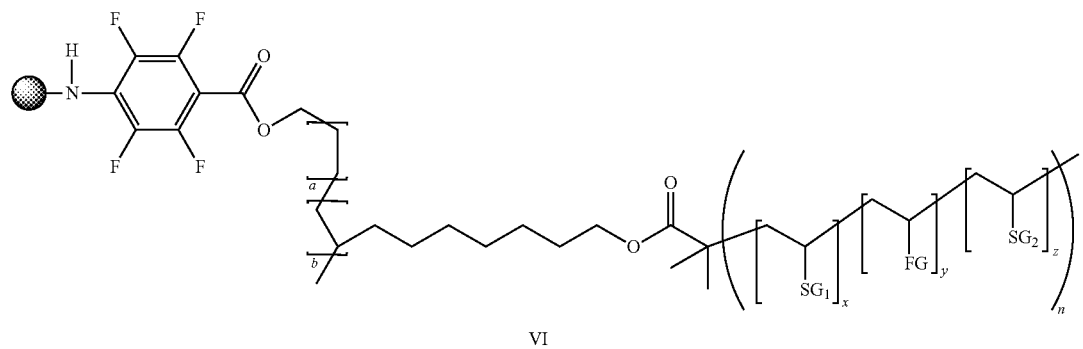

VI wherein,
- FG represents a functional group that provides charging sites/charges to pigment surfaces. It can be an acidic functional group such as hydroxyl, carboxylate, a sulfonic acid, a phosphonic acid and a phosphorous acid etc. It can also be a basic group such as a primary amine, secondary amine, tertiary amine, pyridine, imidazoline etc.
- $SG_1$ and $SG_2$ represent solublizing and sterically bulky group, which helps to improve the solubility of the polymer and stabilize the colorant particles. It could be any alkyl groups, alkoxy groups, branched alkyl groups, branched alkoxy groups aliphatic esters, branched aliphatic esters, and such groups as substituted phenyl groups.
- The letters x, y, and z are each independently an integer between 1 and about 5,000.
- The letter n is an integer between 1 and about 100.
- The letter a is an integer between 0 and about 5,000, while the letter b, which determines the number of grafts, is an integer of 2 or more. In some examples, a ranges from 1 to about 5,000. In some examples, b ranges from 2 to about 5,000.
- The sphere ball represents any possible electrophoretic particles with all possible colors such as RGB or CYMK. It may be a colored pigment or colored polymeric particle, with a particle size ranging from about 50 nm to 1 μm. It may be organic or inorganic.

Scheme 7 describes a specific example of such graft copolymers modified pigments that bear negative charges via azide chemisrty. This example describes polyacrylic acid and polystyrene based graft copolymers. Tetrafluorophenyl azide initiator I undergoes a first chain growth polymerization with the first graft monomer, for example, substituted styrene, to give the first portion, namely, a polystyrene tetrafluorophenyl azide graft living polymer II. Living polymer II undergoes a second chain growth polymerization with the second monomer, for example, acrylic acid to give the two-portion living polymer III, namely, a polystyrene and polyacrylic acid tetrafluorophenyl graft living polymer III. Living polymer III undergoes a third chain growth polymerization with the third monomer, for example, a substituted styrene, to give a three-portion living polymer IV, namely, a polystyrene, polyacrylic acid, and polystyrene tetrafluorophenyl azide polymer IV. Polymer IV can be used directly for pigment surface modification. Or one can repeat steps 1, 2 and 3 n times, forming graft copolymer V. Coupling reaction of inorganic or organic pigments with three-graft—polystyrene, polyacrylic acid and polystyrene tetrafluorophenyl azide polymer IV or V upon UV irradiation gives functionalized graft copolymers modified pigment VI. Such graft copolymers modified pigments can be mixed with other surfactants or charge directors to form negatively charged and stable pigment dispersions for electronic ink applications.

Scheme 7
Chemical process towards graft copolymers pigment surface modification via azide chemistry

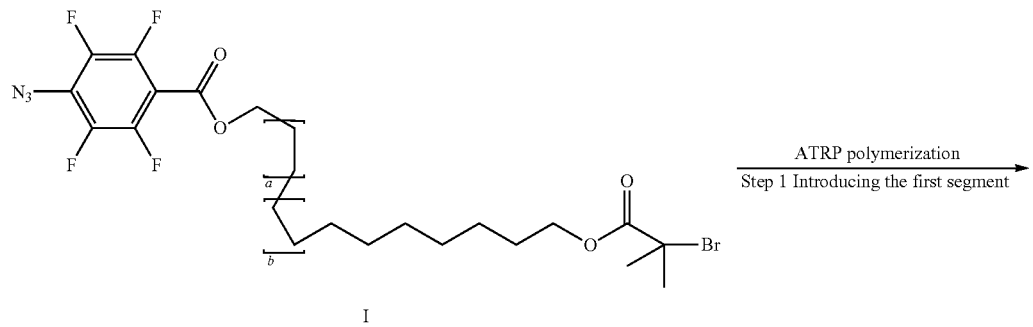

I

ATRP polymerization
Step 1 Introducing the first segment

-continued
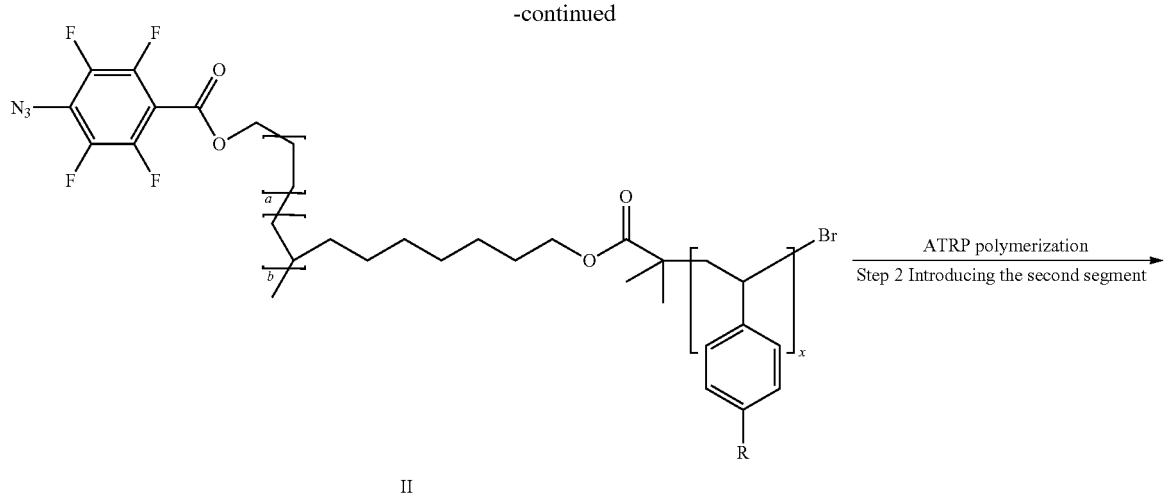
II
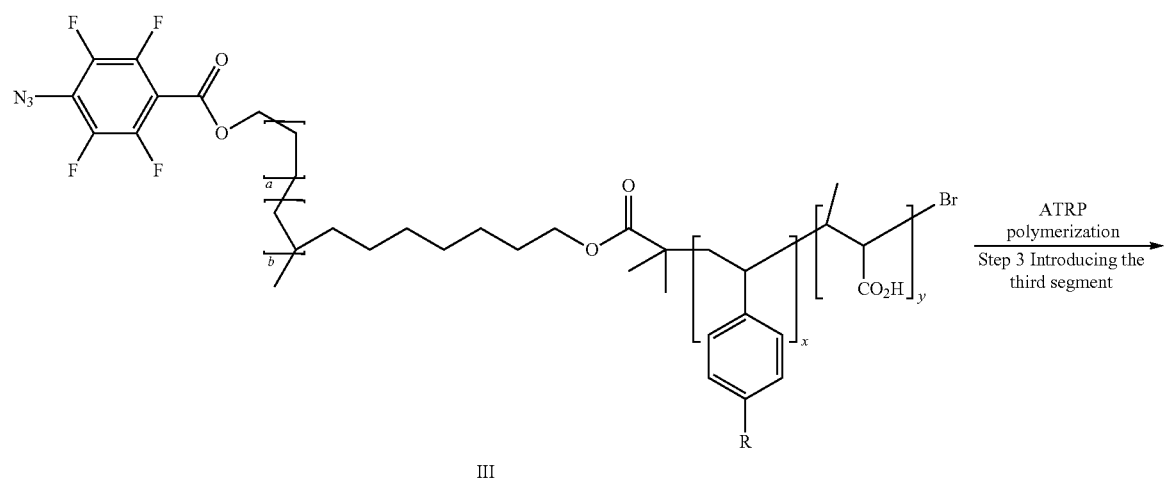
III
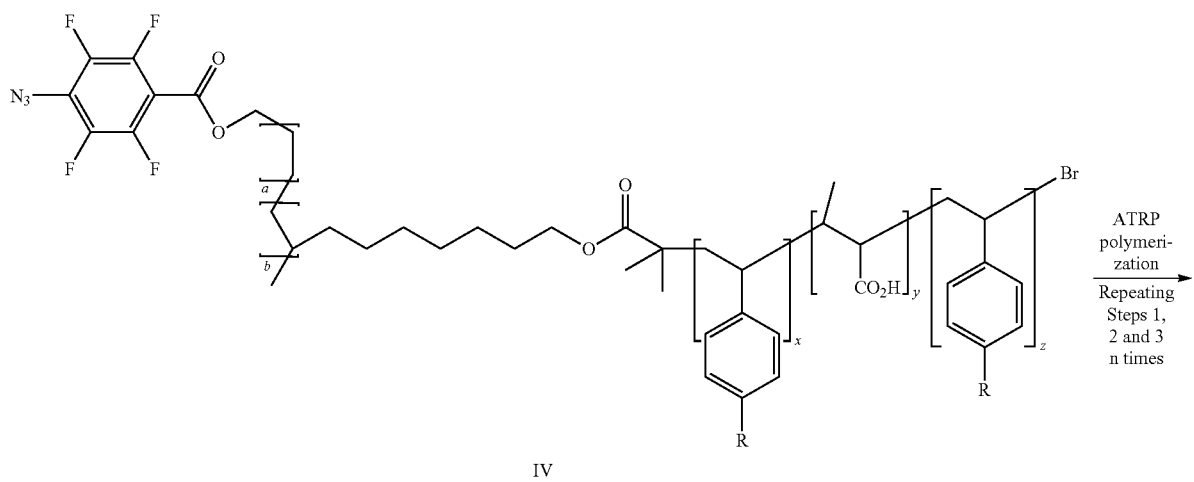
IV

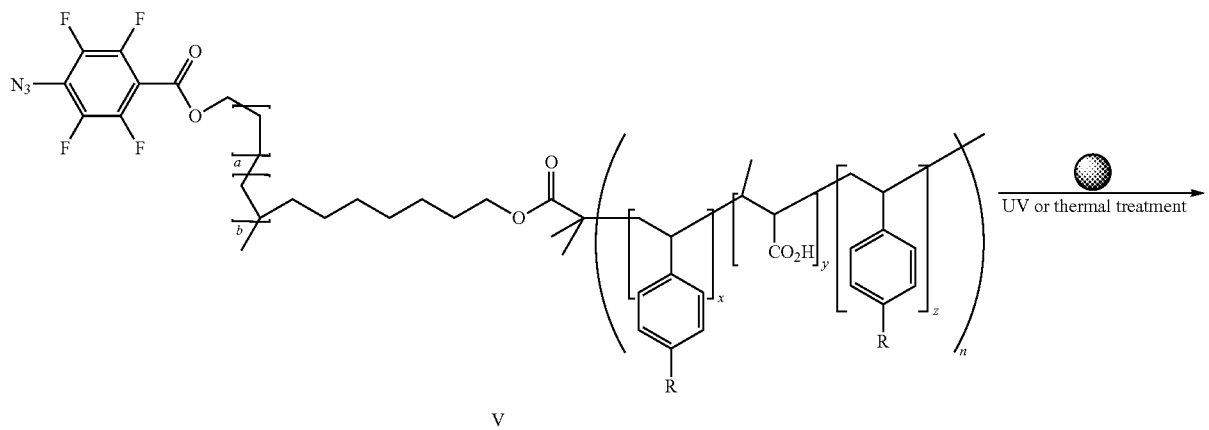

V

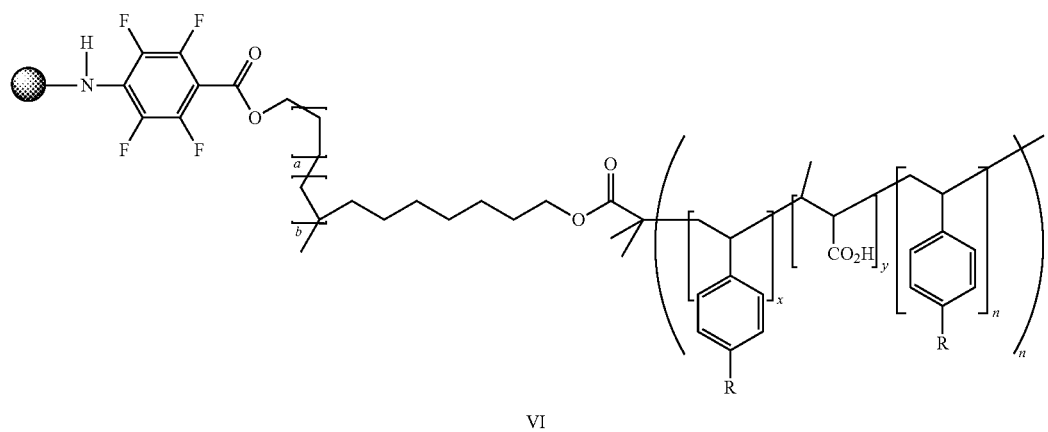

VI wherein,
- R represents sterically bulky group, which helps to improve the solubility of the polymer and stabilize the colorant particles. It could be any alkyl groups, alkoxy groups, branched alkyl groups and branched alkoxy groups.
- The letters x, y, and z are each independently an integer between 1 and about 5,000.
- The letter n is an integer between 1 and about 100.
- The letter a is an integer between 0 and about 5,000, while the letter b, which determines the number of grafts, is an integer of 2 or more. In some examples, a ranges from 1 to about 5,000. In some examples, b ranges from 2 to about 5,000.
- The sphere ball represents any possible electrophoretic particles with all possible colors such as RGB or CYMK. It can be a colored pigment or a colored polymeric particle, with a particle size ranging from about 50 nm to 1 μm. It may be organic or inorganic.

Scheme 8 describes a specific example of such tri-portion graft copolymers modified pigments that bear positive charges. It describes polyacrylate ammonium salts and polystylene based graft copolymers. Tetrafluorophenyl azide initiator I undergoes a first chain growth polymerization with the first monomer, for example, substituted styrenes, to give the first portion, namely, a polystyrene tetrafluorophenyl azide graft living polymer II. Living polymer II undergoes a second chain growth polymerization with the second monomer, for example, an acrylate ammonium salt, to give a two-portion polystyrene and polyacrylate ammonium salt tetrafluorophenyl graft living polymer III. Living polymer III undergoes a third chain growth polymerization with the third monomer, for example, substituted styrene, to give a three-portion polystyrene, polyacrylate ammonium salt, and polystyrene tetrafluorophenyl azide graft polymer IV. Polymer IV can be used directly for pigment surface modification. Or one can repeat steps 1, 2 and 3 n times, forming graft copolymer V. Coupling reaction of inorganic or organic pigments with three-graft—polystyrene, polyacrylic acid and polystyrene tetrafluorophenyl azide polymer IV or V upon UV irradiation gives functionalized graft copolymers modified pigment VI. Such graft copolymers modified pigments can be mixed with other surfactants or charge directors to form charged and stable pigment dispersions for electronic ink applications.

Scheme 8
Chemical process towards graft copolymers pigment surface modification via azide chemsitry
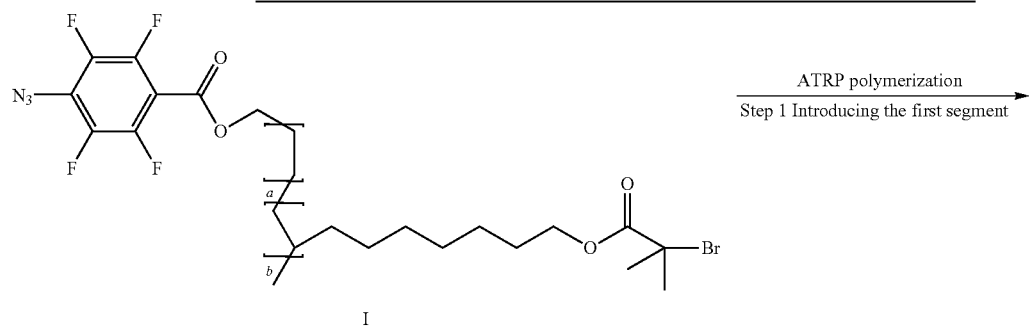
I
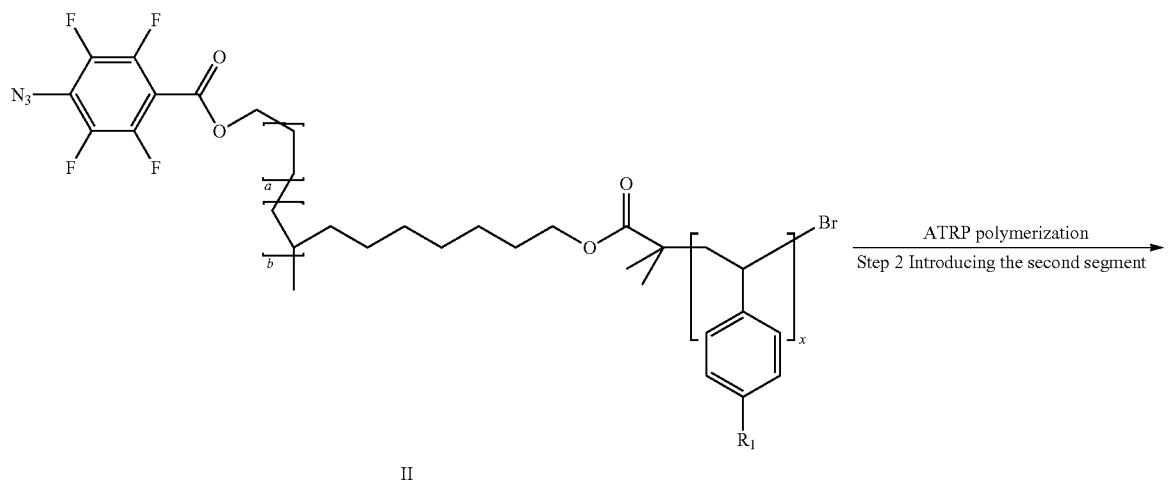
II
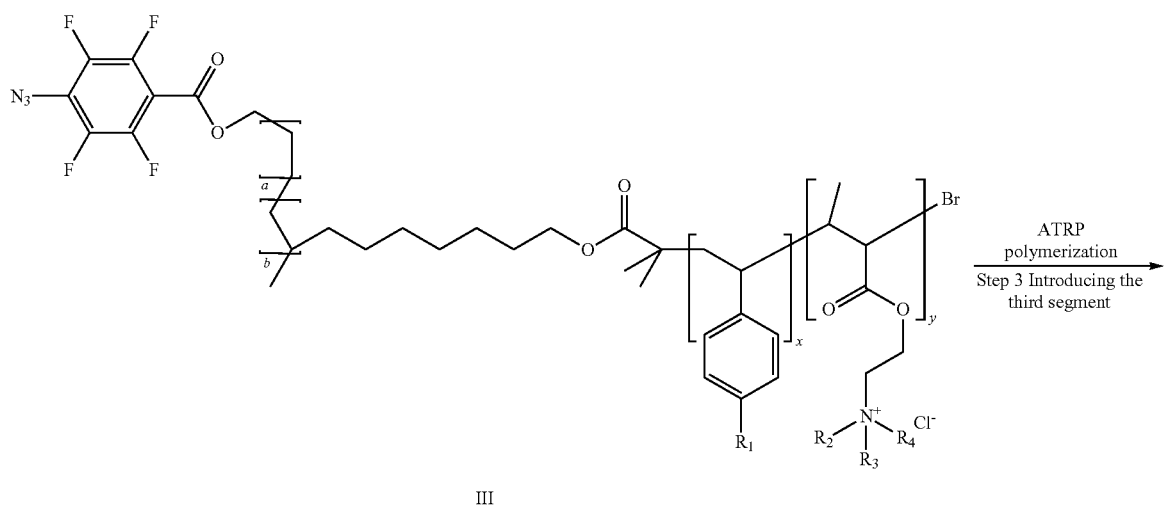
III

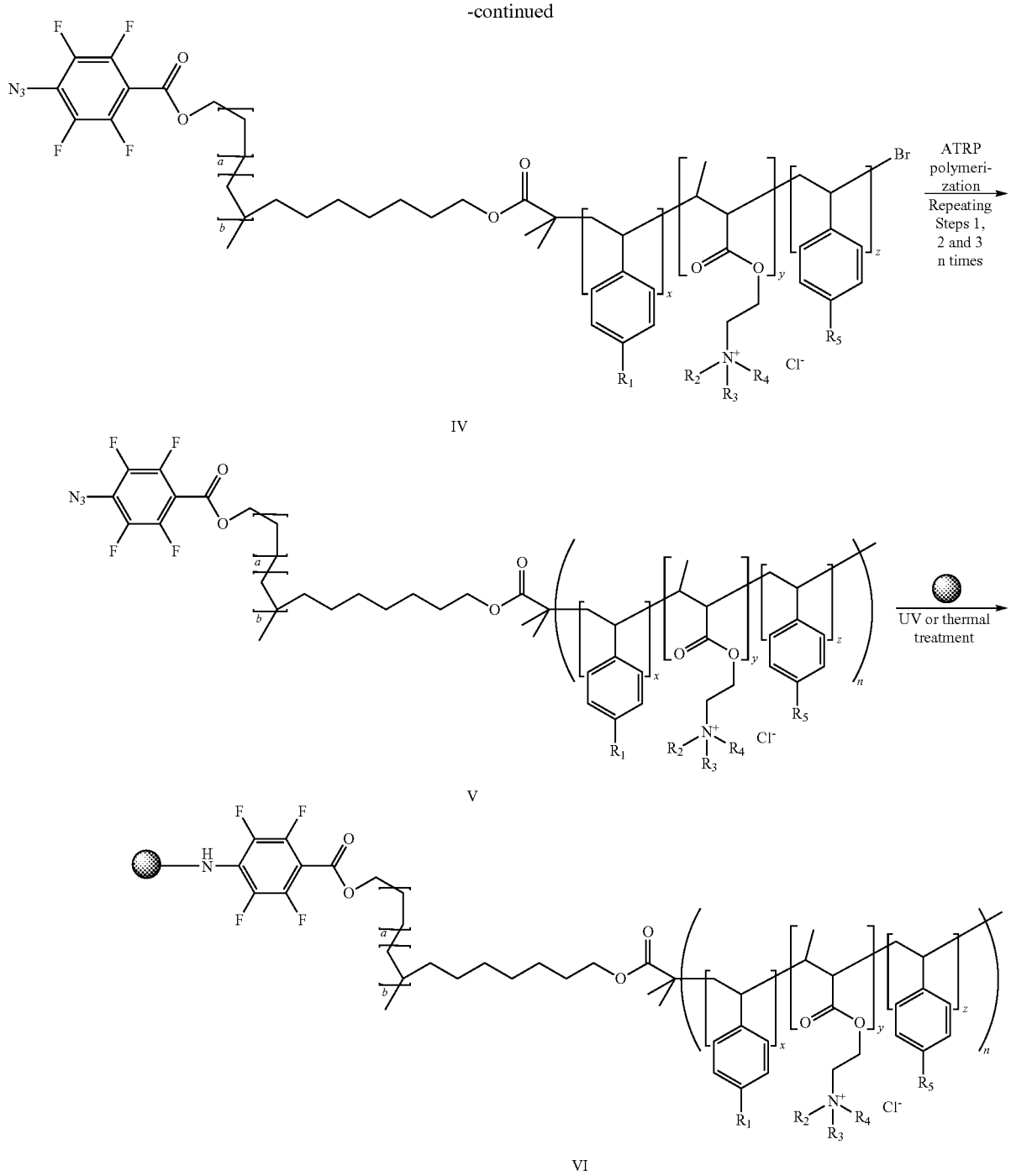

wherein, $R_1, R_2, R_3, R_4$ and $R_5$ are each independently selected from the group consisting of C1-C30 alkyl, C1-C30 alkenyl, C1-C30 alkynyl, C1-C30 aryl, C1-C30 alkoxy, C1-C30 phenoxy, C1-C30 thioalkyl, C1-C30 thioaryl, $C(O)OR_6$, $N(R_7)(R_8)$, $C(O)N(R_9)(R_{10})$, F, C, Br, $NO_2$, CN, acyl, carboxylate and hydroxy, wherein $R_6, R_7, R_8, R_9$ and $R_{10}$ are each independently selected from the group consisting of hydrogen, C1-C30 alkyl and C1-C30 aryl, and so forth. The residues $R_1$, $R_2, R_3, R_4, R_5, R_6, R_7, R_8$ and $R_9$ may or may not be identical.

The letters x, y and z are each independently an integer between 1 and about 5,000.

The letter n is an integer between 1 and about 100.

The letter a is an integer between 0 and about 5,000, while the letter b, which determines the number of grafts, is an integer of 2 or more. In some examples, a ranges from 1 to about 5,000. In some examples, b ranges from 2 to about 5,000.

The sphere ball represents any possible electrophoretic particles with all possible colors such as RGB or CYMK. It can be a colored pigment or a colored polymeric particle, with a particle size ranging from about 50 nm to 1 μm. It may be organic or inorganic.

Figure 4:
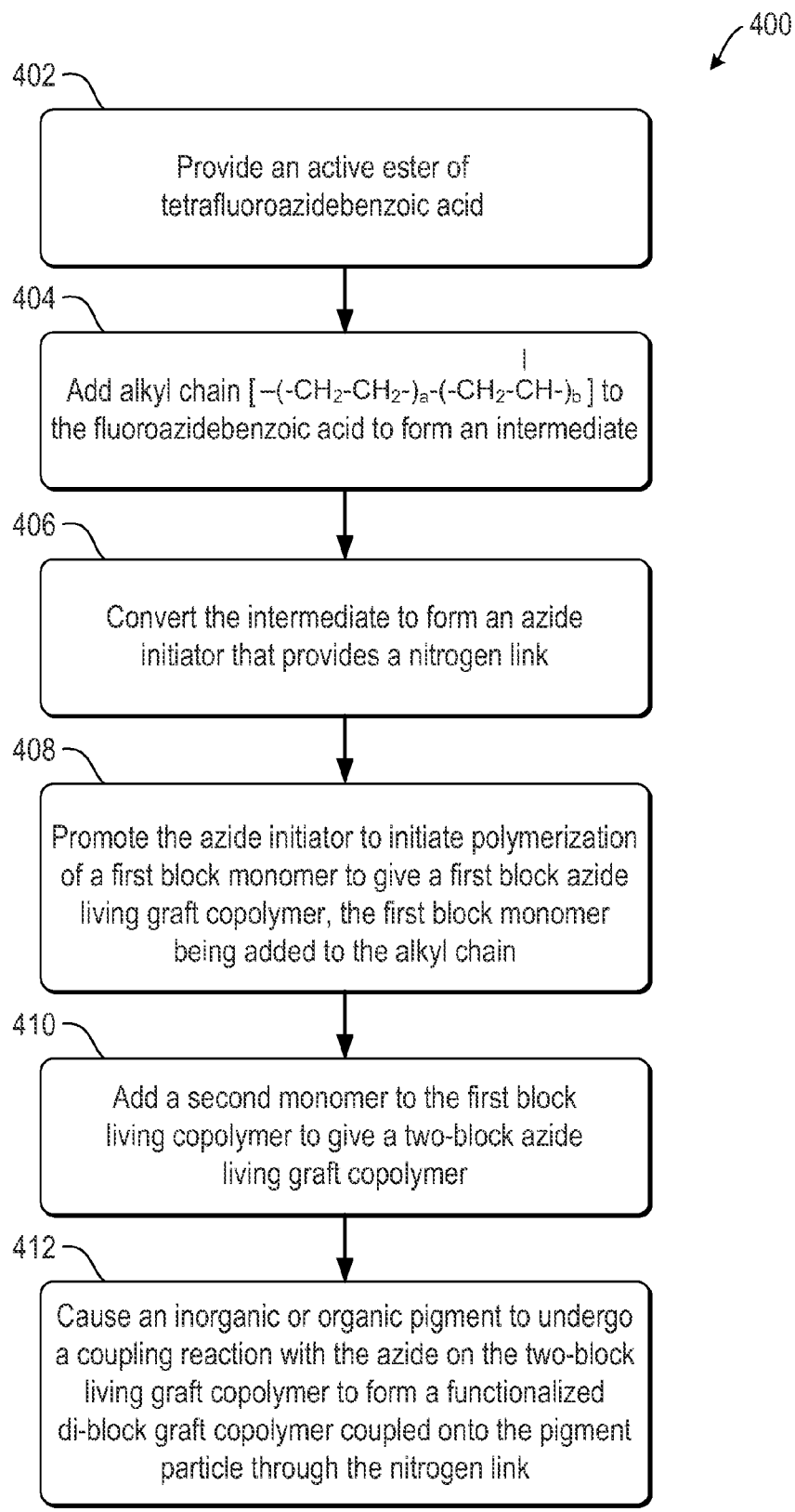
FIG. 4 is a block diagram depicting an example process employed in the practice of the present invention.

An example process 400 for making the nitrogen-linked surface functionalized pigment particle is illustrated in FIG. 4. The process 400 includes providing 402 an active ester of tetrafluoroazidebenzoic acid. The process then further includes adding 404 the alkyl chain

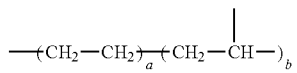

to the tetrafluoroazidebenzoic acid to form an intermediate. The process 400 next includes converting 406 the intermediate to form an azide initiator. The process 400 then includes promoting 408 the azide initiator to initiate polymerization of a first block monomer to give a first block azide living polymer, the first block monomer being added to the alkyl chain. The process 400 next includes adding 410 a second monomer to the first block living polymer to give a two-block azide living graft copolymer. The process then includes causing 412 an inorganic or organic pigment to undergo a coupling reaction with the azide on the two-block living polymer to form a functionalized graft copolymer grafted pigment through a nitrogen link.

The foregoing process forms a di-block graft copolymer. To form a tri-block graft copolymer, the process may be continued by adding a third monomer to the two-block living azide polymer, which yields a three-block azide living graft copolymer and causing the inorganic or organic pigment to undergo a coupling reaction with the azide on the three-block living graft copolymer to form a functionalized tri-block graft copolymer grafted pigment through a nitrogen link.

Turning now to electronic inks that employ the functionalized pigments discussed above, examples of such electronic inks generally include a non-polar carrier fluid (i.e., a fluid having a low dielectric constant k such as, e.g., less than about 20, or, in some cases, less than about 2). Such fluids tend to reduce leakages of electric current when driving the display, as well as increase the electric field present in the fluid. As used herein, the "carrier fluid" is a fluid or medium that fills up a viewing area defined in an electronic ink display and is generally configured as a vehicle to carry colorant particles therein. In response to a sufficient electric potential or field applied to the colorant particles while driving electrodes of the display, the colorant particles tend to move and/or rotate to various spots within the viewing area in order to produce a desired visible effect in the display cell to display an image. The non-polar carrier fluid includes, for example, one or more non-polar carrier fluids selected from hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, octamethylcyclosiloxane, and combinations thereof.

The colorant particles are dispersed in the carrier fluid. As used herein, the term "colorant particles" refers to particles that produce a color. Some non-limiting examples of suitable colorant particles include the surface-modified pigment particles described above, which may be dispersible in the non-polar carrier fluid due to the presence of the di-block or tri-block graft copolymers attached to the pigment surface. However, the total elimination of dispersants, such as those commonly used in dispersing pigment particles in the non-polar carrier fluid, may not be attained. In that case, the electronic ink may include one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TEGO® 650, TEGO® 651, TEGO® 655, TEGO® 685, and TEGO® 1000); and various dispersants manufactured by Sigma-Aldrich, St. Louis, Mo., (e.g., SPAN® 20, SPAN® 60, SPAN® 80, and SPAN® 85).

In some examples, the concentration of pigment in the electronic ink ranges from about 0.01 to 20 percent by weight (wt %). In other examples, the concentration of the pigment ranges from about 1 to 10 wt %. In some examples, the concentration of dispersant in the electronic ink ranges from about 0.5 to 20 percent by weight (wt %). In other examples, the concentration of the dispersant ranges from about 1 to 10 wt %. The carrier fluid makes up the balance of the ink.

There is commonly a charge director employed in electronic inks. As used herein, the term "charge director" refers to a material that, when used, facilitates charging of the colorant particles. In an example, the charge director is basic and reacts with the acid-modified colorant particle to negatively charge the particle. In other words, the charging of the particle is accomplished via an acid-base reaction between the charge director and the acid-modified particle surface. It is to be understood that the charge director may also be used in the electronic ink to prevent undesirable aggregation of the colorant in the carrier fluid. In other cases, the charge director is acidic and reacts with the base-modified colorant particle to positively charge the particle. Again, the charging of the particle is accomplished via an acid-base reaction between the charge director and the base-modified particle surface or adsorption of charged micelles.

The charge director may be selected from small molecules or polymers that are capable of forming reverse micelles in the non-polar carrier fluid. Such charge directors are generally colorless and tend to be dispersible or soluble in the carrier fluid.

In a non-limiting example, the charge director is selected from a neutral and non-dissociable monomer or polymer such as, e.g., a polyisobutylene succinimide amine, which has a molecular structure as follows:

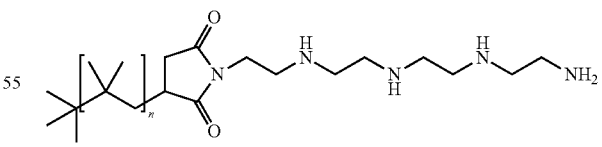

where n is selected from a whole number ranging from 15 to 100.

Another example of the charge director includes an ionizable molecule that is capable of disassociating to form charges. Non-limiting examples of such charge directors include sodium di-2-ethylhexylsulfosuccinate and dioctyl sulfosuccinate. The molecular structure of dioctyl sulfosuccinate is as follows:

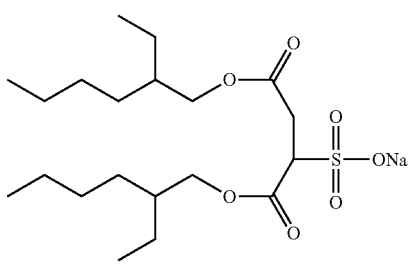

Yet another example of the charge director includes a zwitterion charge director such as, e.g., lecithin. The molecular structure of lecithin is as shown as follows:

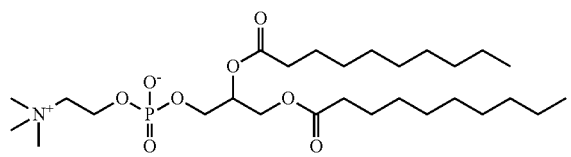 [SMILES: CCCCCCCCCC(=O)OCC(COP(=O)([O-])OCC[N+](C)(C)C)OC(=O)CCCCCCCCC]

The foregoing discussion has been directed to the functionalization of $TiO_2$ pigment particles (white color). However, the teachings herein are equally applicable to other pigments, whether inorganic or organic, and of whatever color. Such inorganic and organic pigments are described further below, along with examples of different colors.

The pigment particles are selected from organic or inorganic pigments, and have an average particle size ranging from about 1 nm to about 10 μm. In some examples, the average particle size ranges from about 10 nm to about 1 μm. In other examples, the average particle size ranges from about 30 to 500 nm. In still other examples, the average particle size ranges from about 50 nm to 1 μm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles. In some instances, the organic or inorganic pigment particles may include spot-color pigment particles, which are formed from a combination of a predefined ratio of two or more primary color pigment particles. To the extent that the generic pigments on the foregoing list can be functionalized as taught herein, such pigments may be used in the practice of the teachings herein. Likewise, to the extent that the following examples of specific pigments can be functionalized as taught herein, such pigments may be used in the practice of the teachings herein.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Colombian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Other examples of inorganic pigments include metal oxides and ceramics, such as the oxides of iron, zinc, cobalt, manganese, nickel. Non-limiting examples of suitable inorganic pigments include those from the Shepherd Color Company (Cincinnati, Ohio) such as Black 10C909A, Black 10P922, Black 1 G, Black 20F944, Black 30C933, Black 30C940, Black 30C965, Black 376A, Black 40P925, Black 411A, Black 430, Black 444, Blue 10F545, Blue 10G511, Blue 10G551, Blue 10K525, Blue 10K579, Blue 211, Blue 212, Blue 214, Blue 30C527, Blue 30C588, Blue 30C591, Blue 385, Blue 40P585, Blue 424, Brown 10C873, Brown 10P835, Brown 10P850, Brown 10P857, Brown 157, Brown 20C819, Green 10K637, Green 187 B, Green 223, Green 260, Green 30C612, Green 30C654, Green 30C678, Green 40P601, Green 410, Orange 10P320, StarLight FL 37, StarLight FL105, StarLight FL500, Violet 11, Violet 11C, Violet 92, Yellow 10C112, Yellow 10C242, Yellow 10C272, Yellow 10P110, Yellow 10P225, Yellow 10P270, Yellow 196, Yellow 20P296, Yellow 30C119, Yellow 30C236, Yellow 40P140, Yellow 40P280.

In addition to the foregoing inorganic pigments, the same teachings may be employed with organic pigments. The following is a list of organic pigments that may be treated in accordance with the teachings herein.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, Pigment Yellow 155, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Advantageously, the herein-disclosed methods of grafting particles with novel functionalized graft copolymers and their dispersion in non-polar solvents results in minimal need for additional surfactants or charge directors. The methods use a step-wise process to two or three different chemically-functionalized polymers which are consecutively grafted onto the particle/polymer surface. Each block of these functionalized graft copolymers can be designed to optimize its intended function in the system based on the specific particle chemistry, solvent choice, and system requirement. For example, for the tri-block graft copolymer, the inner block can be designed to provide the best compatibility to the particle surface chemistry while exhibiting adequate solubility in the non-polar solvent. The middle block can be designed to achieve the appropriate charge functionality in combination with the particle chemistry and other additives. The outer block can be designed to provide adequate steric stabilization to prevent agglomeration based on system requirements. For example, the outer block could be different for the same particle species in a single species ink compared to a dual species/charge system. Using this new technology, one can also make stable dual color electronic inks based on both positively charged particles and negatively charged particles, since the charges are separated by steric stabilizing groups, which prevents the agglomeration and precipitation of the two particle species due to the attraction of opposite charges.

The electronic inks based on such graft copolymers grafted onto pigment particles are very stable, since the both the charge-producing and steric stabilization groups are covalently bonded to the pigment surface. This approach contributes to the robustness of the particle. Because there is minimal need to add additional surfactants to stabilize the ink, the final electronic ink will have low background charge, and as a result will exhibit less field screening effects which limit the clearing performance of electronic inks. This surface modification technology can be applied to both organic and inorganic pigments.

The foregoing functionalized pigments have been described with specific application to electronic inks. However, the functionalized pigments may find use in other ink technologies that employ non-aqueous inks. An example of such other ink technology is liquid electrophoretic ink (LEP) used in commercial digital printers.

What is claimed is:

1. Pigment based inks including:

a non-polar carrier fluid; and a surface-functionalized pigment particle including a nitrogen-linked moiety to the surface of the pigment particle through a nitrogen link at one end of the nitrogen-linked moiety and a graft copolymer having two or three blocks attached at another end, the pigment particle suspended in the non-polar carrier fluid, the nitrogen-linked moiety further including an alkyl chain interposed between the nitrogen-linked moiety and the graft copolymer having the structure

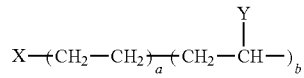

where X is the nitrogen-linked moiety, Y is a copolymer, and the letter a is an integer between 0 and about 5,000, while the letter b is an integer of 2 or more.

2. The inks of claim 1 wherein the non-polar carrier fluid is a non-polar solvent selected from the group consisting of hydrocarbons, halogenated hydrocarbons, partially halogenated hydrocarbons, and siloxanes.

3. The inks of claim 1 wherein the pigment particle is selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

4. The inks of claim 1 the graft copolymer has a formula selected from the group consisting of graft copolymer 1, graft copolymer 2, and graft copolymer 3, as shown below:

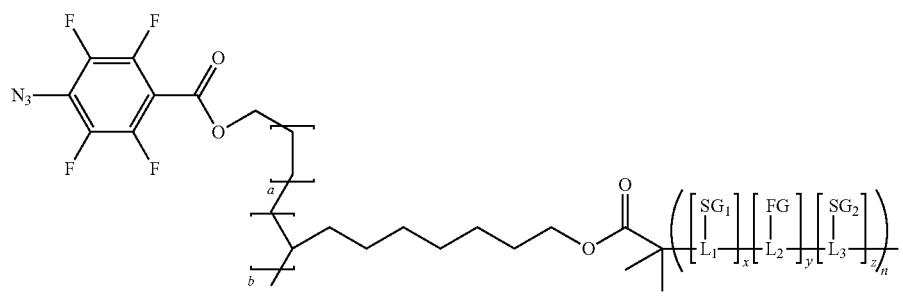

Graft copolymer 1

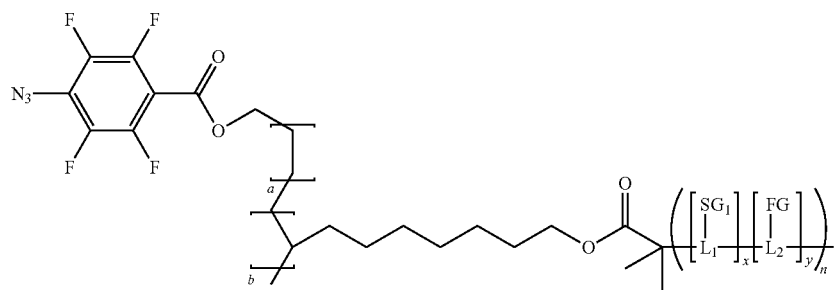

Graft copolymer 2

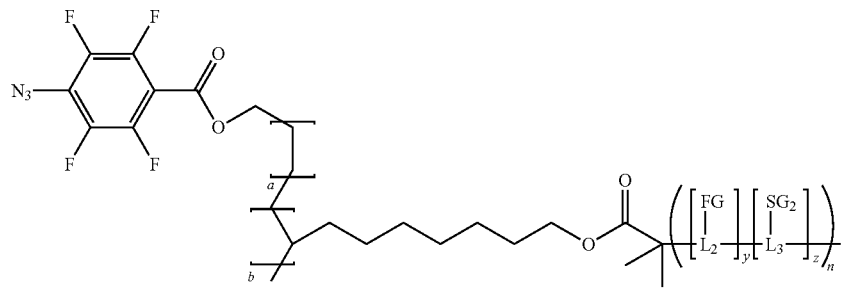

Graft copolymer 3 wherein,

- $L_1$, $L_2$, and $L_3$ are each independently a covalent bond or chemical structure providing a covalent bond between different blocks selected from the group consisting of C—C, C=C, C=N, C=O, and N=N;
- $SG_1$ and $SG_2$ each independently represent a solubilizing and sterically bulky group, which helps to improve the solubility of the polymer and stabilize colorant particles, selected from the group consisting of alkyl groups, alkoxy groups, branched alkyl groups, branched alkoxy groups, aliphatic esters, branched aliphatic esters, substituted phenyl groups, and macromolecular monomers;
- FG represents a functional group that provides charging sites to pigment surfaces, selected from acidic functional groups and basic groups;
- x, y, and z are each independently an integer between 1 and about 5,000;
- n is an integer between 1 and about 100; and
- a is an integer between 0 and about 5,000, while b is an integer between 2 and about 5,000.

5. The inks of claim 4 wherein FG is selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates.

6. The inks of claim 4 wherein at least one of $SG_1$ and $SG_2$ comprises the macromolecule monomer selected from the group consisting of

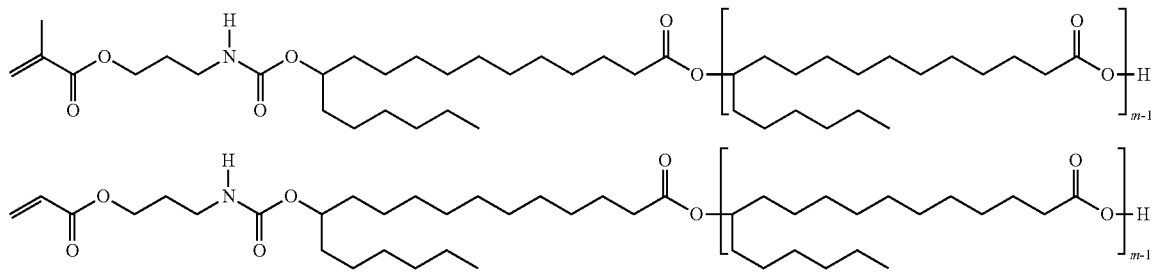

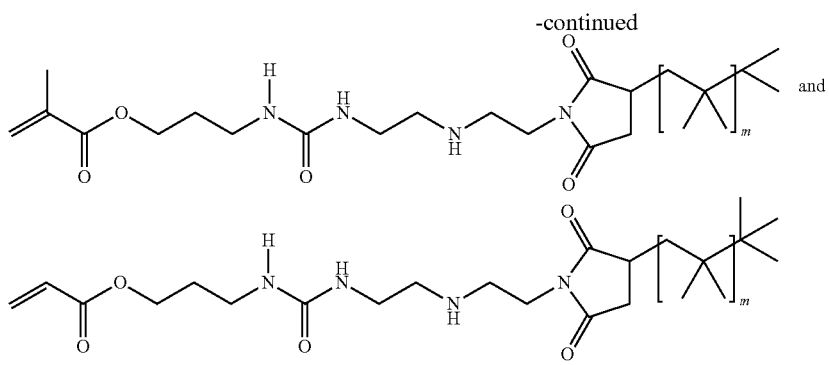

wherein m is an integer from 1 to about 5,000.

7. The inks of claim 4 wherein one or both of $SG_1$ and $SG_2$ comprises

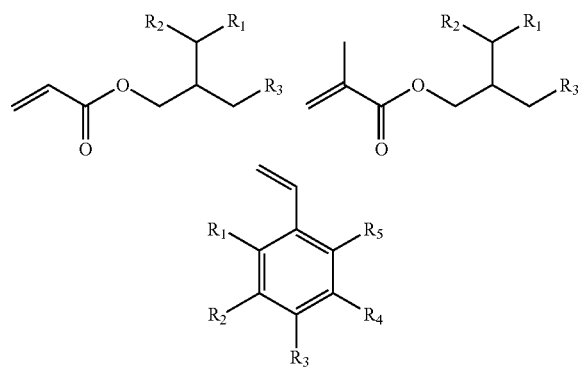

wherein,
$R_1$, $R_2$, $R_3$, $R_4$ and $R_5$ are each independently selected from the group consisting of C1-C30 alkyl, C1-C30 alkenyl, C1-C30 alkynyl, C1-C30 aryl, C1-C30 alkoxy, C1-C30 phenoxy, C1-C30 thioalkyl, C1-C30 thioaryl, C(O)$OR_6$, N($R_7$)($R_8$), C(O)N($R_9$)($R_{10}$), F, Cl, Br, $NO_2$, CN, acyl, carboxylate and hydroxy, wherein $R_6$, $R_7$, $R_8$, $R_9$ and $R_{10}$ are each independently selected from the group consisting of hydrogen, C1-C30 alkyl and C1-C30 aryl, and wherein $R_1$, $R_2$, $R_3$, $R_4$, $R_5$, $R_6$, $R_7$, $R_8$ and $R_9$ may or may not be identical.

8. The inks of claim 1 further including a charge director, wherein the charge director is a small molecule or polymer that is capable of forming reverse micelles in the non-polar carrier fluid.

9. In combination, an electronic display and an electronic ink, wherein the electronic display includes:
a first electrode;
a second electrode; and
a display cell having a recess defined by a dielectric material, the first electrode, and the second electrode, the display cell containing the electronic ink, wherein the electronic ink includes the inks of claim 1.

10. The combination of claim 9 wherein the electronic display includes a plurality of display cells in a stacked configuration, associated first electrodes and second electrodes, and a plurality of electronic inks of different colors, each display cell containing an electronic ink of a different color.

11. The combination of claim 9 wherein the non-polar carrier fluid is a non-polar solvent selected from the group consisting of hydrocarbons, halogenated hydrocarbons, partially halogenated hydrocarbons, and siloxanes.

12. The combination of claim 9 wherein the pigment particle is a colored polymeric particle having a size ranging from 1 nm to 10 μm and is selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

13. The combination of claim 9 further including a charge director, wherein the charge director is a small molecule or polymer that is capable of forming reverse micelles in the non-polar carrier fluid.

14. A method for making the nitrogen-linked surface functionalized pigment particle of claim 1, including:
providing an active ester of tetrafluoroazidebenzoic acid;
adding the alkyl chain

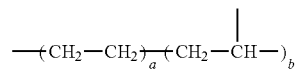

to the tetrafluoroazidebenzoic acid to form an intermediate;
converting the intermediate to form an azide initiator that provides a nitrogen link;
promoting the azide initiator to initiate polymerization of a first block monomer to give a first block azide living graft copolymer, the first block monomer being added to the alkyl chain;
adding a second monomer to the first block living copolymer to give a two-block azide living graft copolymer; and
causing an inorganic or organic pigment to undergo a coupling reaction with the azide on the two-block living graft copolymer to form a functionalized di-block graft copolymer coupled onto the pigment particle through the nitrogen link.

15. The method of claim 14 further comprising adding a third monomer to the two-block azide living graft copolymer, which yields a three-block azide living graft copolymer and causing the inorganic or organic pigment to undergo a coupling reaction with the azide on the three-block living graft copolymer to form a functionalized tri-block graft copolymer coupled onto the pigment particle through the nitrogen link.

* * * * *